R. C. SHEPHERD.
AUTOMOBILE STEERING GEAR LOCK.
APPLICATION FILED APR. 19, 1915.
1,220,996.
Patented Mar. 27, 1917.
2 SHEETS—SHEET 2.
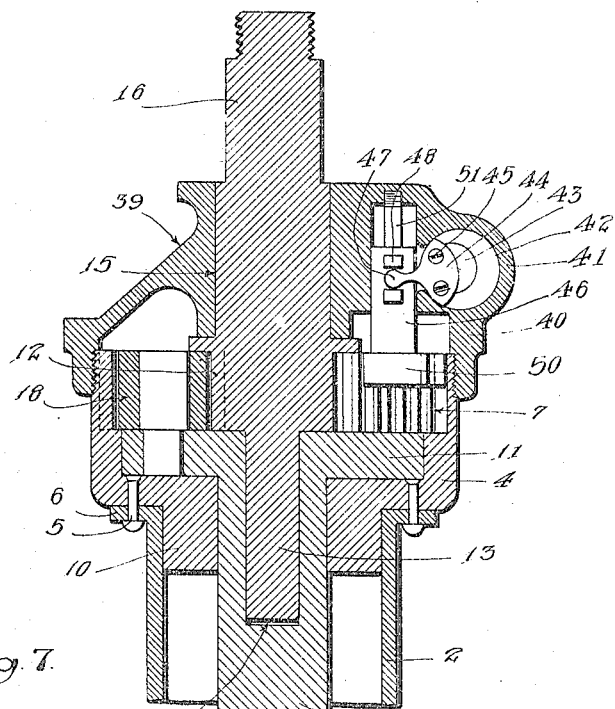
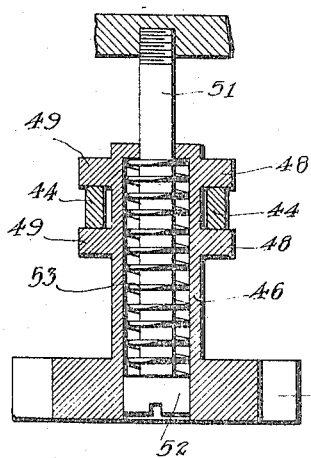
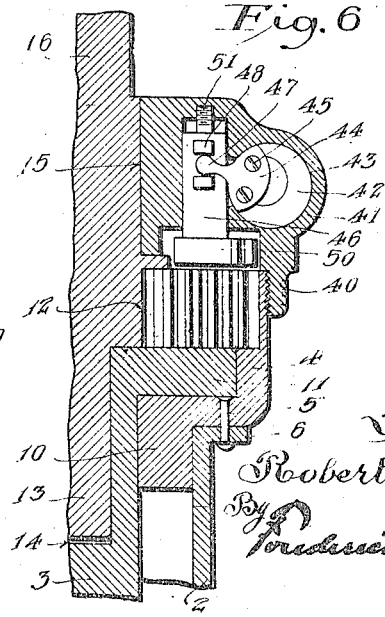
Witnesses:
Inventor
Robert C. Shepherd
By Frederick W. Hyer
Atty

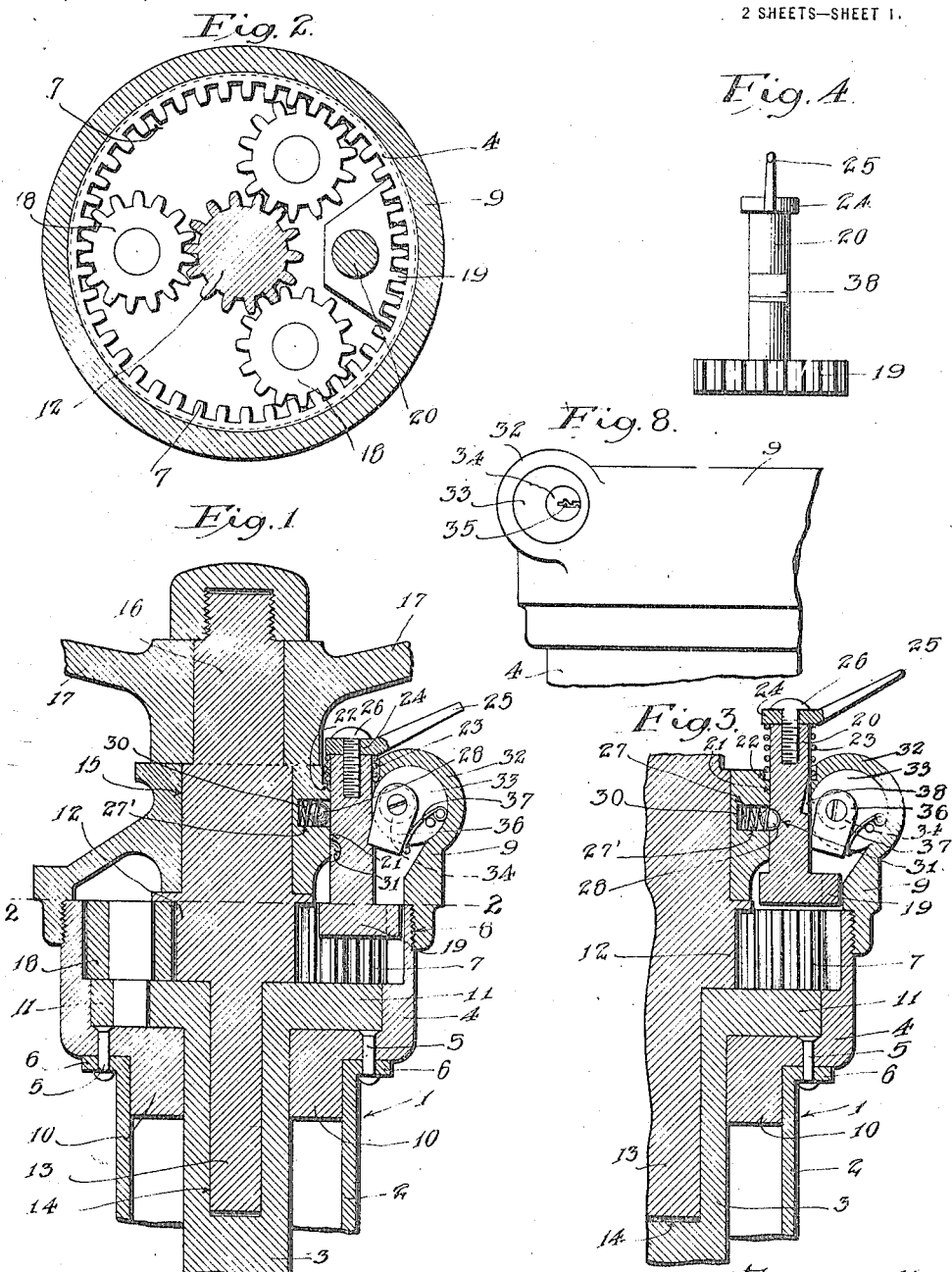

UNITED STATES PATENT OFFICE.

ROBERT C. SHEPHERD, OF LOS ANGELES, CALIFORNIA, ASSIGNOR OF ONE-HALF TO CLINTON F. SHEPHERD, OF LOS ANGELES, CALIFORNIA.

AUTOMOBILE-STEERING-GEAR LOCK.

1,220,996.   Specification of Letters Patent.   Patented Mar. 27, 1917.

Application filed April 19, 1915. Serial No. 22,227.

*To all whom it may concern:*

Be it known that I, ROBERT C. SHEPHERD, a citizen of the United States, residing at Los Angeles, in the county of Los Angeles and State of California, have invented a new and useful Automobile-Steering-Gear Lock, of which the following is a specification.

This invention relates to improvements in automobile locks and resides in the provision of simple and effective means for locking the steering gear of an automobile against operation so that unauthorized persons will be prevented from appropriating the automobile.

One of the objects of the invention is to provide a lock of the character described which may be easily attached to automobiles without necessitating any material change in the construction thereof and which may be quickly operated.

Another object is to provide a lock of the character described that is comparatively small and may be located upon the steering mechanism in such manner that detection thereof will not be readily had and little or no room is taken up.

The invention consists in certain novel features of construction and combination, and arrangement of parts as will be more fully hereinafter described and pointed out in the claims.

In the drawings:

Figure 1 is a vertical sectional view of my lock showing it in locked position and attached to steering gear;

Fig. 2 is a horizontal sectional view taken on line 2—2 of Fig. 1;

Fig. 3 is a fragmentary vertical sectional view of the lock in unlocked position;

Fig. 4 is a detail side elevation of the gear locking mechanism;

Fig. 5 is a vertical sectional view of a modified form of lock showing it attached to steering gear and in locked position;

Fig. 6 is a fragmentary vertical sectional view of the modified form of lock showing it in unlocked position;

Fig. 7 is a side detail vertical sectional view of the gear locking element and coöperating parts of the modified form of lock; and Fig. 8 is a side elevation of part of the lock showing the key opening and its arrangement relative to the steering apparatus.

Briefly my invention comprises means to lock the planetary or other gears of well-known steering apparatus against movement so that turning of the wheels of the automobile is prevented, and while it is particularly designed for planetary steering gear apparatus, it is to be understood that it may be used in connection with other steering gears to which it is applicable.

Referring to the drawings by characters of reference, 1 designates as an entirety steering appartus of a well-known type that is in use and which comprises steering post tubing 2 that is secured to the automobile, not shown, and has mounted therein a rotatable steering post 3. An internal gear case 4 of essentially circular formation is secured by suitable fastening elements 5 to an annular flange 6 on the upper end of the tubing 2. The inner face of the annular side wall of the casing 4 is provided with teeth forming an internal gear 7. The outer side of the case 4 is provided with screw threads 8 near its upper edge and a flanged internally threaded cover cap 9 is turned upon the case 4 upon the screw threads 8.

The case 4 is provided with a central bearing 10 on its lower side through which is journaled the post 3. The post 3 is provided at its upper end with a flat circular head 11 which rests upon the bearing 10 and at its periphery engages the inner face of the side of the case 4 at a point below the internal gear 7. This head 11 is arranged to rotate freely within the case 4 and centrally, supports a steering gear drive pinion 12 which is provided with a depending spindle 13, said spindle being rotatably journaled in an opening 14 formed in the upper end of the post 3.

Carried by the spindle 12 and projecting upwardly therefrom through an opening 15 formed in the cap 9 is a rod 16 which at its upper end is designed to be secured to the steering wheel 17.

Rotatably journaled upon the head 11 are a plurality of planetary pinions 18 which are equidistantly spaced from one another and mesh with the pinion 12 and teeth of the internal gear 7.

The foregoing is a description of the steering gear with which my lock is particularly designed to co-act and said lock comprises means to be interposed between two of the plurality pinions 18 and locked with the internal gear 7 so as to prevent the planetary gears 18 from moving in either direction. The means comprises a toothed segment or locking member 19 that is located between the cap 9 and case 4 and may be positioned within the case between any two of the pinions 18. Only the side of the segment next to the internal gear 7 need be toothed so that said internal gear and segment will interlock. The segment 19 is fixed to the lower end of a vertically slidable plunger 20 and said plunger is mounted within a vertical opening 21 formed through the cap 9, to one side of the center thereof. The upper end of the opening 21 is enlarged to provide an annular shoulder 22 against which rests the lower end of a helical expansion spring 23. The spring 23 is mounted upon the plunger 20 so that its upper end engages the head 24 of a finger piece 25, thus holding the plunger and locking member or segment 19 in up position, free from the gears 18 and 7. The finger piece 25 is secured upon the upper end of the plunger by means of a screw 26.

Additional locking means 27 is provided to hold the plunger 20 in up position and said means comprises a ball 28 that is slidably mounted within a horizontal recess 27' formed in the cap 9 and which opens into the vertical opening 21. A spring 30 is mounted in the recess between the inner end thereof and the ball and forces said ball outwardly. A ball receiving recess 31 is formed in the plunger 20 in such position that it will receive the ball and lock the plunger when it is in "up" position. This locking means 27 prevents accidental moving of the plunger into locking position but is arranged so that the ball 28 will recede from locking position when pressure is brought to bear upon the plunger.

The cap 9 is provided with an enlarged offset housing 32 which receives suitable locking means 33. The locking means 33 includes a rotatable element 34 in which is formed the keyhole 35. This element 34 is normally locked against rotation by suitable means, not shown, and at the inner end thereof a locking dog or member 36 is pivoted. A leaf spring 37 tends to hold said dog outwardly in engagement with the plunger 20 at all times, the housing 32 being communicated with the opening 21 for the plunger. A notch 38 is formed in the plunger and is designed to receive the dog 36 when the plunger is forced downwardly into locking position, thus locking the plunger against upward movement. When a suitable key, not shown, is inserted in the keyhole 35, the element 34 may be rotated and such rotation will remove the dog 36 from the notch 38 and allow said plunger to spring upwardly through the action of the spring 23.

In operation when it is desired to lock the steering gear the finger piece 25 is engaged and the plunger is forced downwardly so that the locking member of segment 19 is brought into meshing engagement with the internal gear 7, between two of the planetary pinions 18. When the notch 38 is opposite the lower end of the dog 36, said dog will spring into the notch and lock the plunger and segment in locking position. The segment or member 19 is sufficiently wide, as clearly shown in Fig. 2 of the drawings, to prevent any appreciable movement of the steering gear in either direction. To unlock the locking means, a key, not shown, is inserted in the keyhole 35 and said member 34 is allowed to turn so that the dog 36 is brought out of engagement with the notch 38.

Referring particularly to Figs. 5, 6 and 7, wherein I have illustrated a modified form of my invention, 39 designates steering mechanism of the type heretofore described and which includes a cap 40 which is provided with an offset housing 41 to receive locking means 42 that is similar to the locking means 33. In this form the locking means 42 has a rotatable element 43 on one end of which is rigidly secured a locking finger or member 44. Screws or other suitable fastening elements 45 are inserted through the finger member 44 and into the member 43. The finger 44 extends into the opening for the plunger 46 and at its free end is forked and embraces the plunger, the free ends of said forked portion of the finger being rounded as at 47 and loosely engaged between pairs of spaced lugs 48 and 49, which are carried by the plunger 46.

A toothed locking member or segment 50 is carried on the lower end of the plunger and is designed to interlock with the internal gear of the mechanism 39 as does the member 19 of the preferred form.

The plunger 46 is hollow and has its upper end closed. A guide member 51 is removably secured at its upper end to the upper end of the opening for the plunger in said cap 40. The guide member 51 is slidably extended through the closed end of the plunger 46 and is of considerably less diameter than said plunger. A head 52 carried on the lower end of the guide member 51 slidably engages the inner sides of the hollow plunger and supports an expansion spring 53 which is mounted on the plunger and engages the upper closed end thereof, also the head 52. This spring tends to hold the plunger and member 50 in up position.

In operation when it is desired to lock the steering gear, a suitable key, not shown, is inserted through the keyhole of the lock 42, said keyhole being the same as shown in Fig. 8, and the member 43 which is locked until the key is inserted, may be turned so as to force the plunger downwardly and spring the segment 50 into locking position. When the segment 50 is in gear locking position the key, not shown, can be removed, inserted and turned to unlock the locking means and cannot be removed until turned to cause the lock to lock.

In practice I have found that the form of my invention illustrated in the drawings and referred to in the above description as the preferred embodiment is the most efficient and practical, yet realizing that the conditions concurrent with the adoption of my device will necessarily vary, I desire to emphasize the fact that various minor changes in construction, proportion and arrangement of parts may be resorted to when required without sacrificing any of the advantages of my invention as set forth in the appended claims.

What I claim is:

1. In an automobile steering gear lock, the combination with steering gear including a rotary steering post, a steering wheel and gears connecting the post and wheel, of means to hold said gears against operation.

2. In an automobile steering gear lock, the combination with steering gear including a rotary steering post, a steering wheel and gears connecting the post and wheel, of means to hold said gears against operation, and means to lock said means in gear-holding position.

3. In an automobile steering gear lock, the combination with steering gear including a rotary post, a steering wheel, a drive pinion operated by the wheel, rotatable and bodily rotatable gears carried by the post and meshing with the pinion, and means to prevent the gears from rotating bodily.

4. In an automobile steering gear lock, the combination with steering gear including a rotary post, a steering wheel, a drive pinion operated by the wheel, rotatable and bodily rotatable gears carried by the post and meshing with the pinion, means to prevent the gears from rotating bodily, and means to lock said gear locking means in locked position.

5. In an automobile steering gear lock, the combination with steering gear including a rotary post, a steering wheel, a drive pinion operated by the wheel, rotatable and bodily rotatable gears carried by the post and meshing with the pinion, and a stationary gear meshing with the bodily rotatable gears, of means adapted to be positioned between the bodily rotatable gears and interlocking with the stationary gear to lock said bodily rotatable gears against rotation bodily.

6. In an automobile steering gear lock, the combination with steering gear including a rotary post, a steering wheel, a drive pinion operated by the wheel, rotatable and bodily rotatable gears carried by the post and meshing with the pinion, and a stationary gear meshing with the bodily rotatable gears, of means adapted to be positioned between the bodily rotatable gears and interlocking with the stationary gear to lock said bodily rotatable gears against rotation bodily and means to lock said means in gear locking position.

7. The combination with steering gear including a rotary steering post, a wheel, a stationary gear, a drive pinion operated by the wheel, rotatable and bodily rotatable gears meshing with the stationary gear and pinion, a gear locking member, and means to position said gear locking member in locking coöperation with the stationary gear and in the path of travel of said bodily rotatable gears.

8. The combination with steering gear including a rotatable steering post, a wheel, a stationary gear, a drive pinion operated by the wheel, rotatable and bodily rotatable gears meshing with the stationary gear and pinion, a gear locking member, means to position said gear locking member in locking coöperation with the stationary gear and in the path of travel of said bodily rotatable gears, and means to lock said means in gear locking position.

9. The combination with steering gear including a rotatable steering post, a wheel, a stationary gear, a drive pinion operated by the wheel, rotatable and bodily rotatable gears meshing with the stationary gear and pinion, a gear locking member, means to position said gear locking member in locking coöperation with the stationary gear and in the path of travel of said bodily rotatable gears, means to lock said means in gear locking position, and means to move said locking member out of locking position when said locking means is unlocked.

10. The combination with steering gear including a steering post, a steering wheel and gears connecting the post and wheel, of a locking member to prevent operation of said gears, means to normally hold said locking member in out-of-the-way position, means to move said locking member into locking position, and locking means to lock and unlock said locking member in and from locking position.

11. The combination with steering gear including a rotary post, a steering wheel, a drive pinion operated by the wheel, rotatable and bodily rotatable gears carried by the post and meshing with the pinion, an internal stationary gear meshing with said bodily rotatable gears, said bodily rotatable gears being spaced from one another, of a locking member having teeth for locking coöperation with the internal stationary gear and adapted to be moved between the bodily rotatable gears to prevent them from being rotated bodily, means to normally hold said member in up position, means to move said member into locking position.

12. The combination with steering gear including a rotary post, a steering wheel, a drive pinion operated by the wheel, rotatable and bodily rotatable gears carried by the post and meshing with the pinion, an internal stationary gear meshing with said bodily rotatable gears, said bodily rotatable gears being spaced from one another, of a locking member having teeth for locking coöperation with the internal stationary gear and adapted to be moved between the bodily rotatable gears to prevent them from being rotated bodily, means to normally hold said member in up position, means to move said member into locking position, and means to lock said member in locking position.

13. In a device of the class described, the combination with a circular casing provided on its interior curved surface with gear teeth and a series of traveling gears for coöperation therewith; of a block provided with teeth for engagement with the teeth of said casing and adapted to slide into and out of engagement therewith, means for sliding said block, and means for holding said block locked in engagement with said teeth, substantially as described.

In testimony whereof, I have hereunto set my hand at Los Angeles, California, this 7th day of April, 1915.

ROBERT C. SHEPHERD.

In presence of—
CHAS. J. CHUNN,
ANNA F. SCHMIDTBAUER.